US008161133B2

United States Patent
Nakatani et al.

(10) Patent No.: US 8,161,133 B2
(45) Date of Patent: Apr. 17, 2012

(54) NETWORK STORAGE SYSTEM WITH A CLUSTERED CONFIGURATION SHARING A NAMESPACE, AND CONTROL METHOD THEREFOR

(75) Inventors: Yoji Nakatani, Yokohama (JP); Koji Sonoda, Sagamihara (JP); Takahiro Nakano, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 539 days.

(21) Appl. No.: 12/361,713

(22) Filed: Jan. 29, 2009

(65) Prior Publication Data

US 2009/0144290 A1 Jun. 4, 2009

Related U.S. Application Data

(63) Continuation of application No. 11/068,811, filed on Mar. 2, 2005, now abandoned.

(30) Foreign Application Priority Data

Dec. 10, 2004 (JP) .................................. 2004-358499

(51) Int. Cl.
G06F 5/16 (2006.01)
(52) U.S. Cl. ......................................... 709/219; 707/10
(58) Field of Classification Search .................. 709/219; 707/10
See application file for complete search history.

(56) References Cited

U.S. PATENT DOCUMENTS

| 5,873,085 | A | * | 2/1999 | Enoki et al. ........................... | 1/1 |
| 6,671,773 | B2 | | 12/2003 | Kazar et al. | |
| 6,697,846 | B1 | | 2/2004 | Soltis | |
| 6,938,039 | B1 | * | 8/2005 | Bober et al. .................. | 707/704 |
| 7,165,096 | B2 | | 1/2007 | Soltis | |
| 2002/0091828 | A1 | | 7/2002 | Kitamura et al. | |
| 2003/0158836 | A1 | | 8/2003 | Venkatesh et al. | |
| 2003/0191745 | A1 | | 10/2003 | Jiang et al. | |
| 2003/0220985 | A1 | | 11/2003 | Kawamoto et al. | |
| 2004/0088297 | A1 | | 5/2004 | Coates et al. | |
| 2004/0093358 | A1 | | 5/2004 | Ito et al. | |
| 2004/0210583 | A1 | | 10/2004 | Enko et al. | |
| 2004/0236798 | A1 | | 11/2004 | Srinivasan et al. | |
| 2004/0267830 | A1 | | 12/2004 | Wong et al. | |

FOREIGN PATENT DOCUMENTS

| JP | 2001051890 | | 2/2001 |
| JP | 2001142648 | | 5/2001 |
| JP | 2003345643 | | 12/2003 |
| JP | 2006524873 | | 11/2006 |
| WO | 2004097572 | A | 11/2004 |
| WO | 2004097572 | A2 | 11/2004 |

\* cited by examiner

OTHER PUBLICATIONS

Shepler et al "Network File System (NFS) version 4 Protocol" Network Working Group Request for Comments: 3530p Obsoletes: 3010 Category Standard Track, pp. 1-227, IETF home page at the Internet URL:http://www.iett.org/home.html.

*Primary Examiner* — Jeffrey Pwu
*Assistant Examiner* — Farhad Ali
(74) *Attorney, Agent, or Firm* — Brundidge & Stanger, P.C.

(57) ABSTRACT

Provided is a storage system as follows. A server holds a management table that serves to manage a mount point of a file system. The management table stores a file system identifier that uniquely identifies the file system within the storage system, mount point information that indicates the mount point of the file system, and a management server identifier that indicates an identifier of the server that manages the file system. The contents stored in the management table of each server are the same. Upon reception of a request to obtain a file handle, each server returns the file handle requested to be obtained. The file handle indicates, uniquely within the storage system, the storage area on the disk subsystem in which the file relating to the request is stored.

12 Claims, 13 Drawing Sheets

List of File System

| | LDEV | FS | Size | Mount | Server | Option |
|---|---|---|---|---|---|---|
| ○ | LDEV0 | FS0 | 50000 | /dira | sid1 | rw |
| ○ | LDEV1 | FS1 | 30000 | /dirb | sid1 | rw |
| ○ | LDEV2 | FS2 | 20000 | /dirc/subdir1 | sid2 | ro |
| ○ | LDEV3 | FS3 | 200000 | /dirc/subdir2 | sid2 | rw |

Create    Delete    Migrate

*FIG. 12*

NETWORK STORAGE SYSTEM WITH A CLUSTERED CONFIGURATION SHARING A NAMESPACE, AND CONTROL METHOD THEREFOR

The present application is a continuation of application Ser. No. 11/068,811, filed Mar. 2, 2005, now abandoned; which claims priority from Japanese application JP2004-358499 filed on Dec. 10, 2004, the content of which is hereby incorporated by reference into this application.

BACKGROUND OF THE INVENTION

This invention relates to a network attached storage (NAS) having a clustered configuration.

There has been proposed a network attached storage (NAS) that is a storage system connected to a network and used as a shared disk for computers connected to the network. The NAS is composed of a server including a network interface and disk drives storing data. Further, there is disclosed a NAS that includes a plurality of servers and has a clustered configuration in which each of the servers is connected to a network (see, for example, U.S. Pat. No. 6,671,773).

In U.S. Pat. No. 6,671,773, network elements, a switching fabric, and disk elements correspond to the servers of the NAS. The plurality of network elements provided can share a file system. In addition, the plurality of disk elements provided allow migration of the file system on a disk basis.

On the other hand, a network file system (NFS) has been proposed as one of file systems that allow an access to files distributed on a network. According to NFSv4 (RFC 3530), which is the most updated version of the NFS protocol specification as of now, when a file system is migrated between servers, the migration source server responds to an access requested from a client to the file system to notify the client of information on a location of the file system at a migration destination (see the IETF home page at the Internet URL: http://www.ieff.org/home.html, (a search was made online for this specification on Nov. 11, 2004)). Therefore, the client can access the file system at the migration destination based on the notified location information. In addition, a file handle, which is an identifier used for an access, consists of two types, a volatile file handle and a persistent file handle. When the file system is migrated, the volatile file handle thereof can be set to invalid.

SUMMARY OF THE INVENTION

In the case where access loads are concentrated on a particular portion in a NAS having a clustered configuration, a possible solution is to distribute the loads by migrating a file system. However, according to U.S. Pat. No. 6,671,773, it depends on a client which a network element is connected to. As a result, even migration of the file system cannot distribute the access loads on the network element.

Also, according to the IETF home page at the Internet URL: http://www.ieff.org/home.html, for an access to the file system at the migration destination, it is necessary to perform name resolution again and obtain another file handle.

This invention has been made in view of the above-mentioned problem. In one embodiment of the invention, a storage system, including: a plurality of servers; and a disk subsystem that is coupled to the plurality of servers, the disk subsystem including: at least one logical device; and at least one file system that is stored in the at least one logical device, wherein: the servers each hold a management table that serves to manage a mount point of the file system; the management table stores a file system identifier that uniquely identifies the file system within the storage system, mount point information that indicates the mount point of the file system, and a management server identifier that indicates an identifier of the server that manages the file system, while sharing the same contents among the servers; and upon reception of a request to obtain a file handle that indicates a storage area on the disk subsystem in which data on a file within the file system is stored, the servers each return the file handle that indicates, uniquely within the storage system, the storage area on the disk subsystem in which the data on the file relating to the request is stored.

According to this invention, by migrating a file system, it is possible to distribute access loads on a server.

Further, according to this invention, for an access to a file system at a migration destination, it is possible to use a file handle that was obtained before migration of the file system. Consequently, it is unnecessary to perform name resolution again and obtain another file handle.

BRIEF DESCRIPTION OF THE DRAWINGS

FIG. 12 is an explanatory diagram of a file system list display screen that is displayed on a management screen of a management terminal according to the embodiment of this invention.

DETAILED DESCRIPTION OF THE PREFERRED EMBODIMENTS

Figure 1:
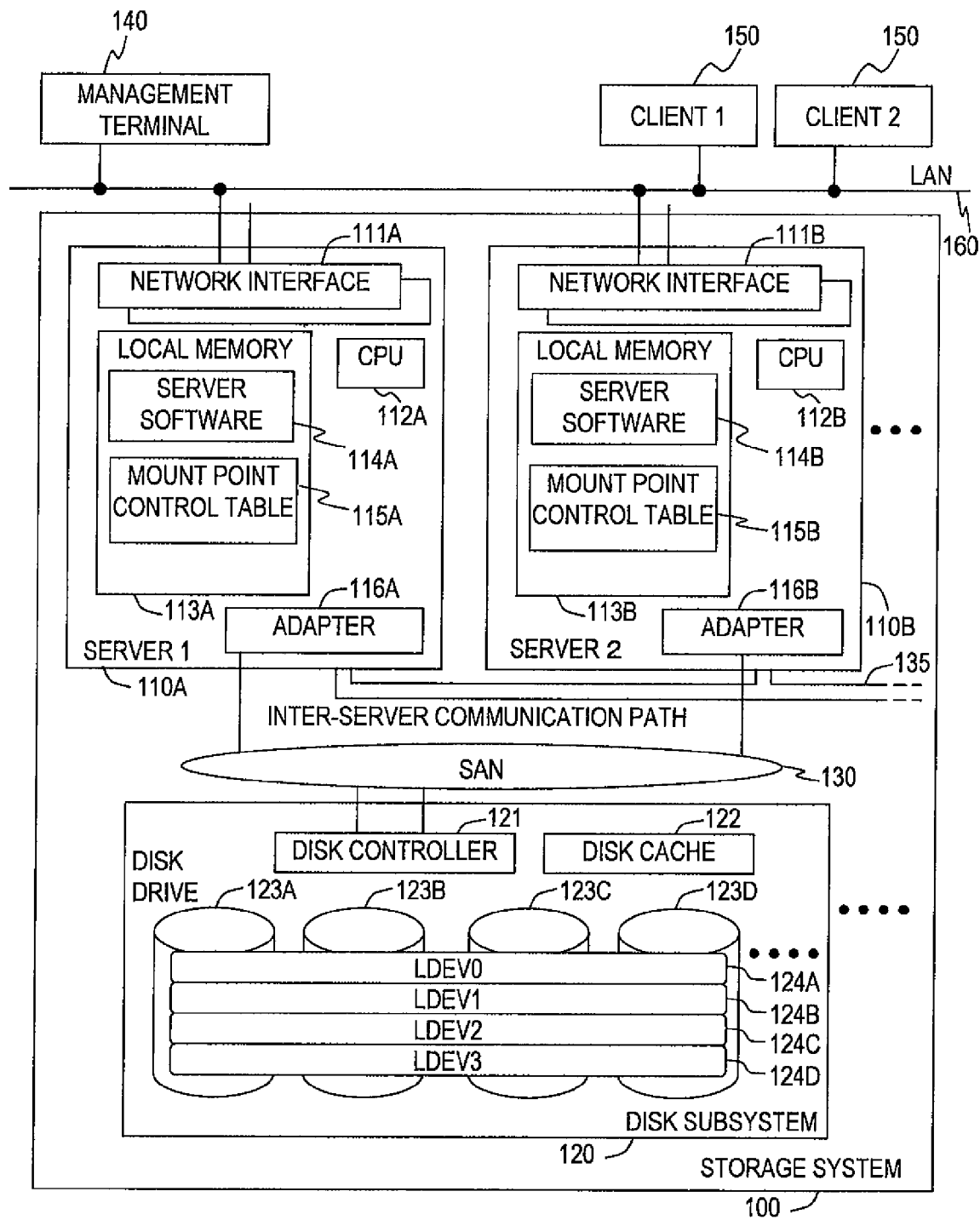
FIG. 1 is a block diagram showing a structure of a storage system according to an embodiment of this invention.

FIG. 1 is a block diagram showing a structure of a storage system according to an embodiment of this invention.

A storage system 100 of this embodiment is connected to a management terminal 140 and clients 150 through a LAN 160.

The management terminal 140 is a computer that instructs the storage system 100 to create, mount, and migrate a file system within the storage system 100. The management terminal 140 includes at least an input/output device (not shown) that has, for example, a management screen and a pointing device. Description will be made later in FIGS. 12 and 13 of contents displayed on the management screen and an operation using the pointing device.

The client 150 is a computer that accesses a file in the storage system 100. To be specific, the client 150 writes a file to the storage system 100 or reads a file from the storage system 100. At this time, the file system of the storage system 100 is used.

FIG. 1 shows only two clients (150A and 150B), but an arbitrary number of clients may be connected to the LAN 160 and access the storage system 100.

The LAN 160 is a network that performs communications via a protocol such as TCP/IP.

The storage system 100 is a so-called network attached storage (NAS). The storage system 100 is composed of a plurality of servers 110, a disk subsystem 120, and a storage area network (SAN) 130 that connects those elements to each other.

The servers 110 each access the disk subsystem 120 in response to an access request from the client 150.

FIG. 1 shows two servers (110A and 110B). The storage system 100 may include more servers 110. The server 110 is also called a NAS head or a NAS node.

The server 110A is composed of a network interface 111A, a CPU 112A, a local memory 113A, and an adapter 116A.

The network interface 111A is an interface that is connected to the LAN 160 and communicates with the management terminal 140 and the client 150.

The CPU 112A is a processor that controls an operation of the server 110A. To be specific, the CPU 112A executes a program stored in the local memory 113A.

The local memory 113A is, for example, a semiconductor memory, and stores a program executed by the CPU 112A and data referenced by the CPU 112A. To be specific, the local memory 113A stores server software 114A and a mount point control table 115A.

Figure 3:
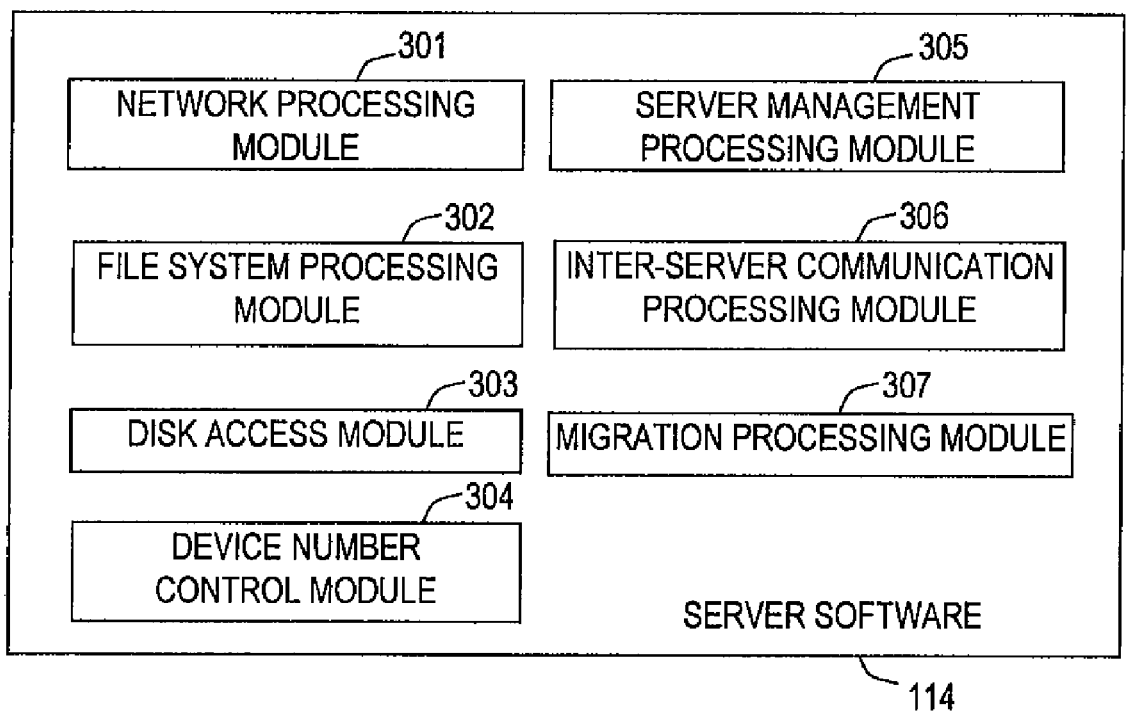
FIG. 3 is an explanatory diagram of a configuration of server software according to the embodiment of this invention.

The server software 114A consists of a plurality of programs executed by the CPU 112A. FIG. 3 will be referenced to describe the server software 114A later in detail.

The mount point control table 115A is a table for managing the mount point of a file system included in the disk subsystem 120. The mount point control table 115A is referenced when the server 110A receives an access request from the client 150, and updated when a file system is added, deleted, or migrated.

The adapter 116A is an interface that is connected to the SAN 130 and communicates with the disk subsystem 120.

Similarly to the server 110A, the server 110B is composed of a network interface 111B, a CPU 112B, a local memory 113B, and an adapter 116B. Those elements are the same as the network interface 11A, the CPU 112A, the local memory 113A, and the adapter 116A, respectively, so description thereof will be omitted.

Even when the storage system 100 includes more servers 110, the servers 110 each have the same configuration as the server 110A.

The SAN 130 is a network that performs communications via a protocol such as Fibre Channel (FC) or SCSI, for example.

When the storage system 100 includes a plurality of servers 110, the servers 110 are connected to each other through an inter-server communication path 135. The servers 110 can communicate with each other through the inter-server communication path 135. To be specific, when the contents of the mount point control table 115 of one server 110 is updated, the updated contents are sent to another server 110 through the inter-server communication path 135. Upon reception, the server 110 reflects the updated contents that have been received on the mount point control table 115 within the server 110.

In this embodiment, as shown in FIG. 1, the storage system 100 includes the inter-server communication path 135 independently of the SAN 130 and the LAN 160. However, the servers 110 may communicate with each other through the SAN 130 or the LAN 160. Alternatively, the servers 110 may communicate with each other by using a disk cache 122 of the disk subsystem 120. In other words, after the mount point control table 115 of one server 110 is updated, the server 110 writes the updated contents to the disk cache 122. Another server 110 reads out the updated contents written in the disk cache 122, and updates each mount point control table 115. This invention can be implemented regardless of which path the servers 110 may communicate through.

The disk subsystem 120 is composed of a disk controller 121, the disk cache 122, and disk drives 123.

The disk controller 121, which includes at least one port (not shown) connected to the SAN 130, communicates with the servers 110 and controls the disk subsystem 120. To be specific, the disk controller 121 communicates with the servers 110 through the SAN 130, and writes or reads out data to/from the disk drives 123 in response to a request from the server 110.

The disk cache 122 is, for example, a semiconductor memory, and temporarily stores the data written to or read out from the disk drive 123.

The disk drives 123 are hard disk drives that store data. The disk subsystem 120 includes an arbitrary number of disk drives 123. The disk drives 123 may configure a RAID array. FIG. 1 shows four disk drives (123A to 123D).

A storage areas of the disk drives 123 are divided into an arbitrary number of logical devices (LDEVs) 124. An LDEV 124 is an area that is used as a logical disk drive by the disk controller 121. When the disk drives 123 configure a RAID array, as shown in FIG. 1, an LDEV 124 may be defined by the storage areas of a plurality of disk drives. The size of each LDEV 124 is arbitrarily set.

FIG. 1 shows an example of the four LDEVs (124A to 124D). Each LDEV 124 is assigned with an LDEV identifier (ID). In the example of FIG. 1, IDs of the LDEVs 121A to 124D are LDEV0 to LDEV3, respectively. Hereinafter, the respective LDEVs are represented by the LDEV IDs (LDEV0 to LDEV3).

Figure 2:
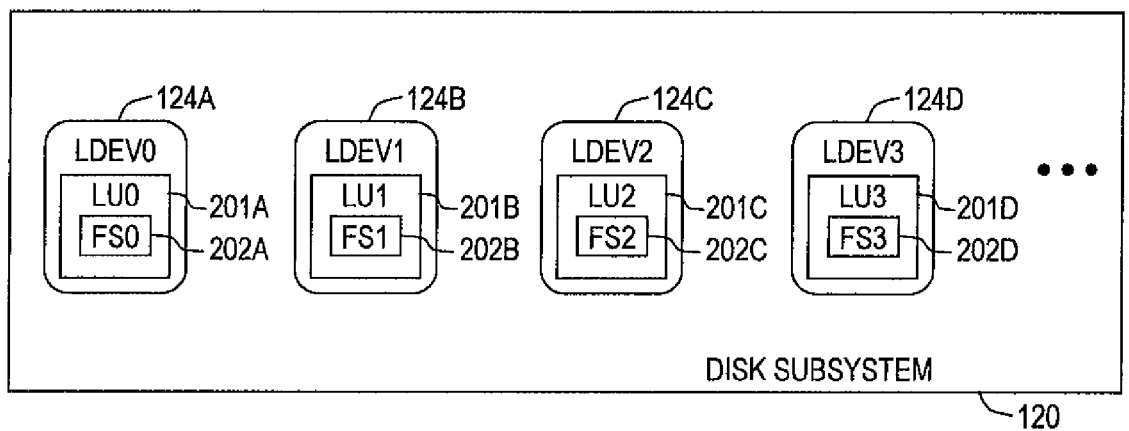
FIG. 2 is a block diagram showing a logical structure of a disk subsystem according to the embodiment of this invention.

FIG. 2 will be referenced to describe the contents of the respective LDEVs later in detail.

The storage system 100 may include a plurality of disk subsystems 120. In that case, the disk subsystems 120 are each connected to the SAN 130. The servers 110 can access any of the disk subsystems 120 through the SAN 130.

FIG. 2 is a block diagram showing a logical structure of the disk subsystem 120 according to the embodiment of this invention.

As shown in FIG. 1, the disk subsystem 120 includes an arbitrary number of LDEVs 124. The LDEVs 124 each have a corresponding logical unit (LU) 201.

The LU 201 is an area used as a logical disk drive by the servers 110. In general, one LDEV 124 may correspond to one LU 201, or include a plurality of LUs 201. In this embodiment, the LDEV 124 corresponds to the LU 201 in a one-toone manner. The LDEVs 124A to 124D correspond to the LUs 201A to 201D, respectively.

The LUs 201 are each assigned with an LU identifier (ID).

In general, the disk controller 121, which includes a plurality of ports, may have a plurality of paths through which the servers 110 access one LU 201. The LU ID is assigned to each LU based on each path by the disk subsystem 120. For example, "0" and "1" may be assigned as LU ID of the same LU 201 within an LDEV0 based on a path A (not shown) and a path B (not shown), respectively.

The disk controller 121 includes a table (not shown), which associates the LU IDs with the LDEVs 124, for each path. When a request to access an LU "0" is received from the server 110 through the path A, the disk controller 121 references the table and accesses the LU 201 within the LDEV0. Similarly, when a request to access an LU "1" is received from the server 110 through the path B, the disk controller 121 references the table and accesses the LU 201 within the LDEV0.

In this embodiment, the correspondences between LDEV IDs and LU IDs are shared within the storage system 100 regardless of the paths. In other words, the server 110 identifies an identical LU 201 based on an identical LU ID. In the example of FIG. 2, the IDs of the LUs 201A to 201D are LU0 to LU3, respectively. Hereinafter, the respective LUs 201 are represented by the LU IDs (LU0 to LU3).

However, this invention can be applied to the case where the correspondences between LDEV IDs and LU IDs are not shared within the storage system 100 (in other words, the case where the correspondences differ among the paths).

The LUs 201 each include a file system (FS) 202. In general, one LU 201 may have a plurality of file systems 202. In this embodiment, one LU 201 has one file system 202. The file systems 202A to 202D are included in the LU0 to the LU3, respectively.

The file systems 202 are each assigned with a file system identifier (ID). In the example of FIG. 2, the IDs of the file systems 202A to 202D are FS0 to FS3, respectively. Hereinafter, the file systems 202 are represented by the file system IDs (FS0 to FS3).

FIG. 3 shows an explanatory diagram of a configuration of the server software 114 according to the embodiment of this invention.

The server software 114 includes programs that are executed by the CPU 112 and consist of a network processing module 301, a file system processing module 302, a disk access module 303, a device number control module 304, a server management processing module 305, an inter-server communication processing module 306, and a migration processing module 307.

The network processing module 301 is a program for controlling communications through the LAN 160 with respect to the management terminal 140 and the clients 150.

Figure 6:
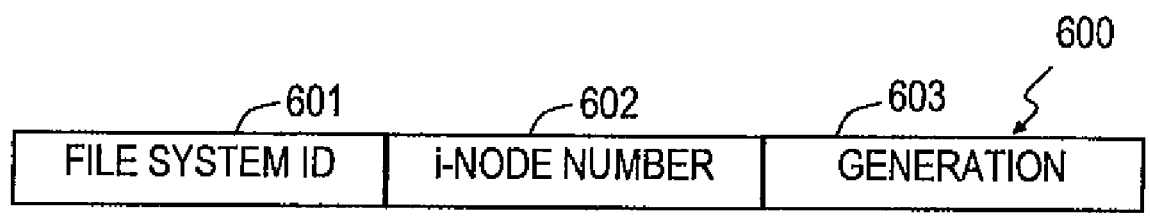
FIG. 6 is an explanatory diagram of a file handle according to the embodiment of this invention.
Figure 9:
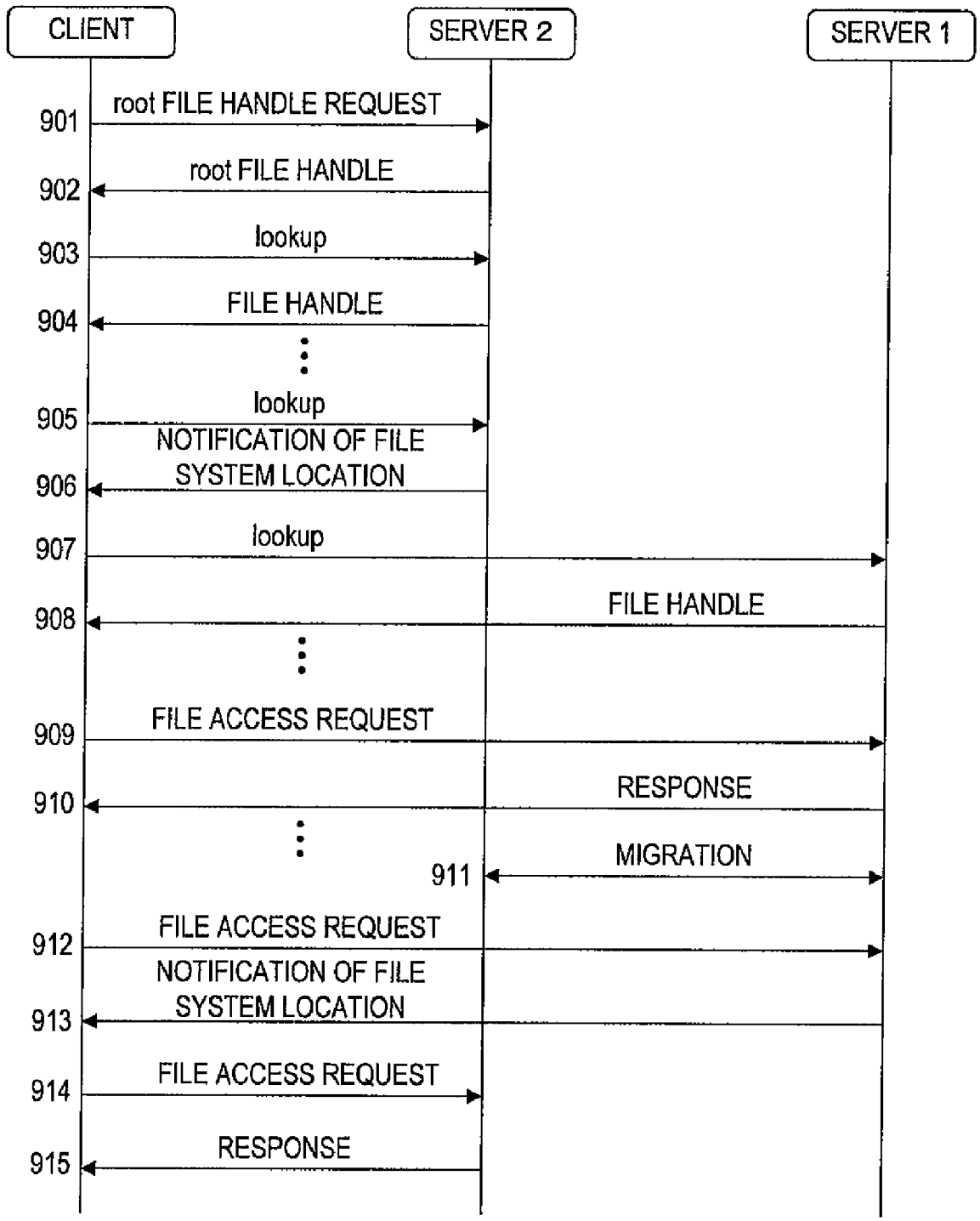
FIG. 9 is a sequential diagram of a file access processing executed according to the embodiment of this invention.

The file system processing module 302 is a program for processing a request to access from the client 150 to a file within the file system 202. To be specific, for example, according to an instruction from the management terminal 140, the file system processing module 302 creates a new file system. In addition, for example, when a request to obtain a file handle, as shown in FIG. 6, which designates a directory name or a file name, is received from the client 150, the file system processing module 302 performs name resolution and returns the file handle. FIG. 9 will be referenced to describe a processing executed by the file system processing module 302 later in detail.

The disk access module 303 is a program for executing an access to data within the file system 202 in response to the access request from the client 150.

The device number control module 304 is a program for obtaining the LDEV ID from the disk subsystem 120. The LDEV ID is an identifier assigned to the LDEV 124 to be managed by the disk subsystem 120. Thus, generally, the servers 110 have no need to know the LDEV ID. However, the LDEV ID is uniquely determined within the disk subsystem 120 regardless of which server 110 accesses the disk subsystem 120. Therefore, by using the LDEV ID as a file system ID, as shown in FIG. 6, within a file handle or a portion of the file system ID, it is possible that the file system 202 is uniquely identified by all the servers 110. The device number control module 304 makes an inquiry to the disk subsystem 120 and obtains the LDEV ID.

The server management processing module 305 is a program for communicating with the management terminal 140 to set a NAS. For example, upon reception of an instruction to create a new file system from the management terminal 140, the server management processing module 305 passes the instruction to the file system processing module 302 and causes the creation of a new file system to be executed. In addition, upon reception of an instruction of migration from the management terminal 140, the server management processing module 305 passes the instruction to the migration processing module 307 and causes the migration to be executed.

The inter-server communication processing module 306 is a program for controlling communications between the servers 110 through the inter-server communication path 135. For example, when the contents of the mount point control table 115 is updated, the inter-server communication processing module 306 sends the updated contents to another server 110.

Figure 10:
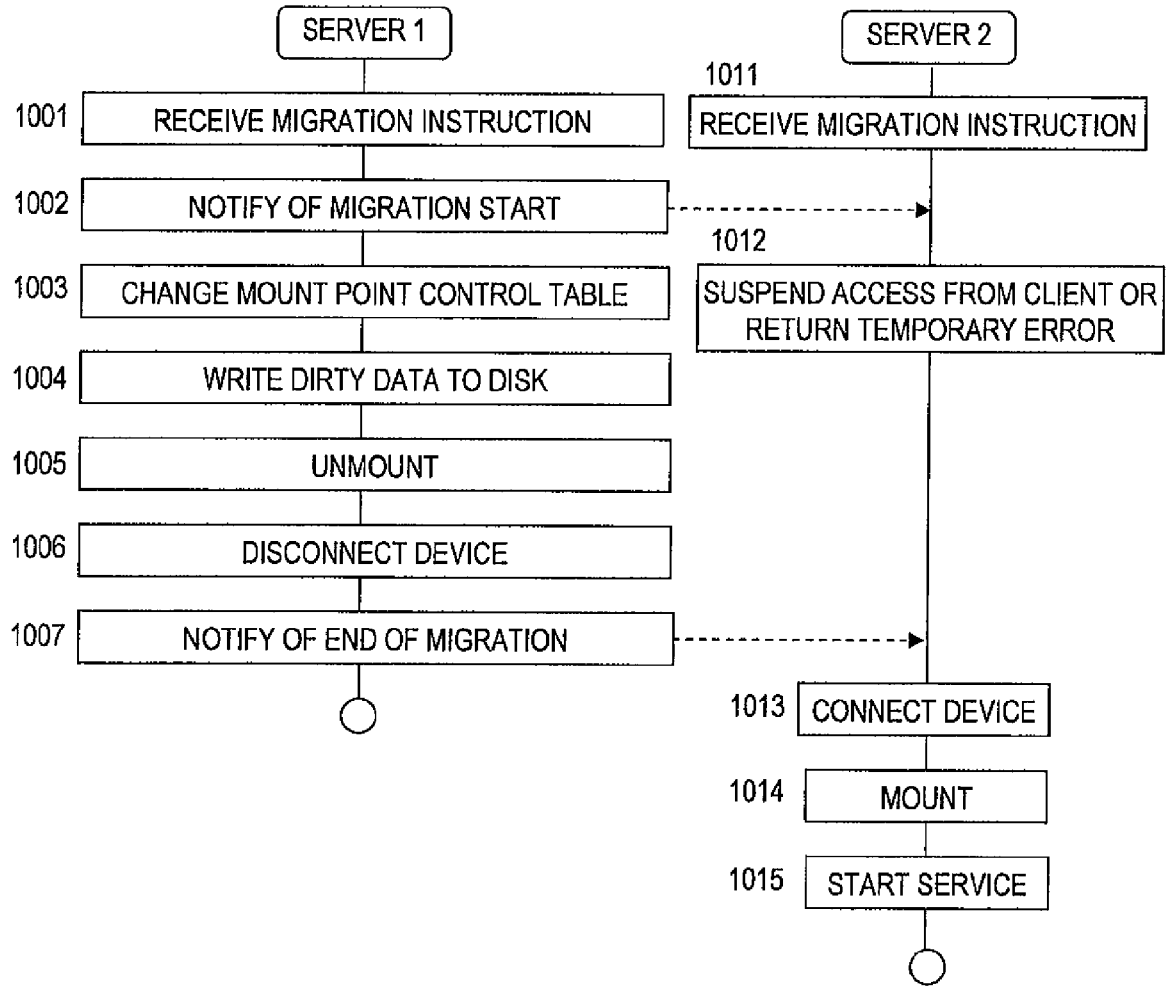
FIG. 10 is a flowchart of a migration processing executed according to the embodiment of this invention.

The migration processing module 307 is a program for executing migration. FIG. 10 is used for the specific description later in detail.

Figure 4:
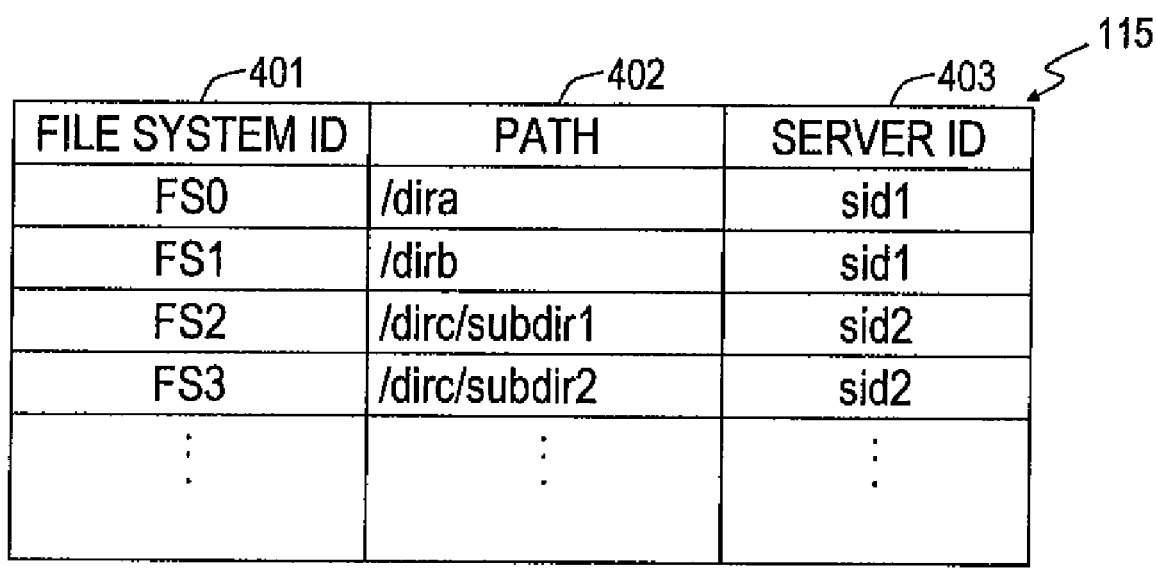
FIG. 4 is an explanatory diagram of a mount point control table according to the embodiment of this invention.

FIG. 4 is an explanatory diagram of the mount point control table 115 according to the embodiment of this invention.

The mount point control table 115 is a table used for managing a mount point of the file system 202 included in the disk subsystem 120, and includes a file system ID 401, a path 402, and a server ID 403.

One entry (row) of the mount point control table 115 corresponds to one file system 202.

The file system ID 401 is the ID of the mounted file system 202. In the example of FIG. 4, four file systems 202 (FS0 to FS3) are mounted. In this invention, the file system ID 401 needs to be unique within the storage system 100.

As in this embodiment, when one LDEV 124 has only one file system 202 and has an LDEV ID unique within the storage system 100, the LDEV ID may be used as the file system ID 401. In this case, the device number control module 304 obtains the LDEV ID from the disk subsystem 120. The file system processing module 302 uses the LDEV ID, which has been obtained by the device number control module 304, as the file system ID 401.

In the above-mentioned case, when one LDEV 124 corresponds to one LU 201 and when the correspondences between the LDEVs and the LU IDs are shared on all the paths, the LU ID may be used as the file system ID 401.

In contrast, when one LDEV 124 has a plurality of file systems 202 and when the file systems 202 are each assigned with a file system number unique within the LDEV 124, the combination of an LDEV ID unique within the storage system 100 and the above file system number may be used as the file system ID 401.

When the storage system 100 includes a plurality of disk subsystems 120, there may exist a plurality of LDEVs 124 having the same LDEV ID within the storage system 100. In this case, the combination of an LDEV ID (and a file system number) and an identifier of the disk subsystem 120 may be used as the file system ID 401. The identifier of the disk subsystem 120 is used for uniquely identifying each of the disk subsystems 120 within the storage system 100.

It should be noted that the file system ID 401 may be created by any method other than the above-mentioned methods as long as the file system ID 401 uniquely identifies the file system 202 within the storage system 100.

For example, the servers 110 hold the same numerical value, and when one of the servers 110 creates a new file system 202, the numerical value is used as the file system ID 401. At this time, the numerical value is updated into a value incremented by "1", all the other servers 110 are notified of the updated numerical value. The server 110 to subsequently create another new file system 202 uses the updated numerical value as the file system ID 401. As a result, the file system ID 401 becomes unique within the storage system 100.

Figure 5:
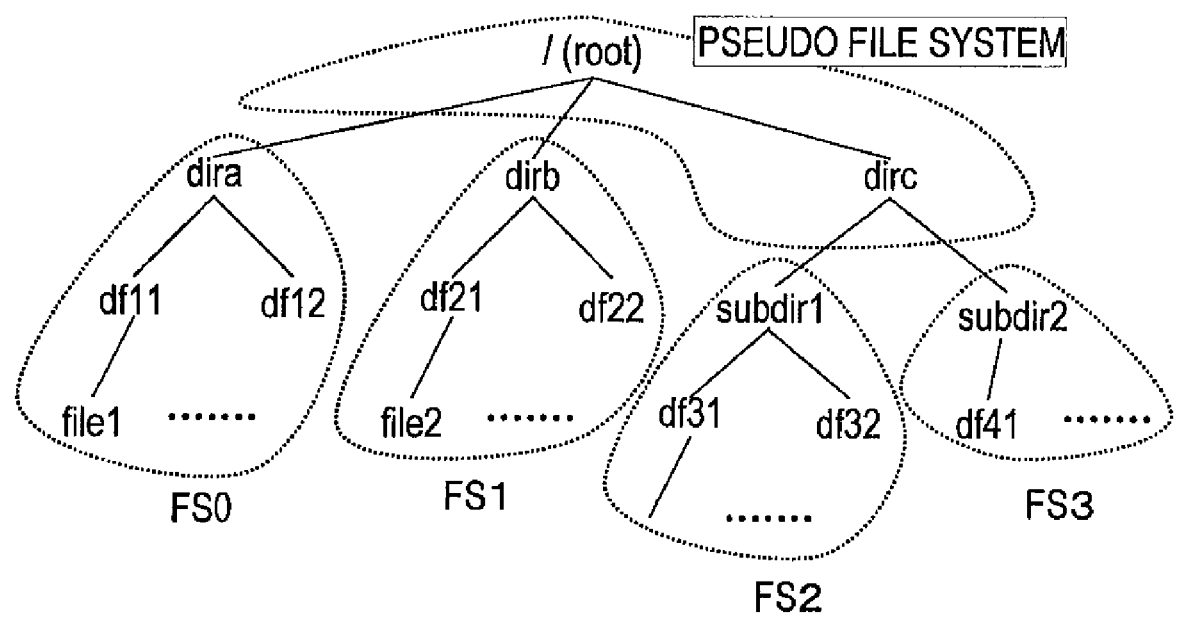
FIG. 5 is an explanatory diagram of a namespace provided to a client according to the embodiment of this invention.

The path 402 indicates a mount point of each file system 202. In the example of FIG. 4, an FS0 is mounted under "/dira". Similarly, an FS1, an FS2, and an FS3 are mounted under "/dirb", "/dirc/subdir1", and "/dirc/subdir2", respectively. FIG. 5 will be referenced to describe a namespace, which is provided when the file systems are mounted as shown in FIG. 4, later in detail.

The server ID 403 is a unique identifier of the server 110 that manages each file system 202. Each server 110 can access only the file system 202 managed by the server 110 itself. In other words, for accessing a file, the client 150 needs to issue an access request to the server 110 that manages the file system 202 including the file.

In the example of FIG. 4, "sid1" is an ID of the server 110A, and "sid2" is an ID of the server 110B. In other words, the FS0 and FS1 are managed by the server 110A, and the FS2 and FS3 are managed by the server 110B.

When the file system 202 is migrated, the contents of the server ID 403 are updated. For example, when the FS0 is migrated from the server 110A to the server 110B, the server ID 403 of the FS0 is updated from "sid1" into "sid2". In addition, a notification of the updated contents is sent to all the servers 110 within the storage system 100 through the inter-server communication path 135. The servers 110 that have received the notification each update the mount point control table 115 according to the notification. As a result, the mount point control tables 115 of all the servers 110 have the same contents.

FIG. 5 is an explanatory diagram of the namespace provided to the client 150 according to the embodiment of this invention.

FIG. 5 shows an example of the namespace provided when the file systems 202 are mounted as shown in FIG. 4. FIG. 5 shows only minimum directories and files that are necessary for explanation, but the file systems 202 may include more directories and files.

In FIG. 5, the FS0 has a directory "df11" and a directory "df12" under the highest directory, and has a file "file1" under the directory "df11".

According to FIG. 4, the FS0 is mounted under "/dira". Therefore, the highest directory of the FS0 is a directory "dira" under a directory "/" (root directory). At this time, the path to the "file1" is "/dira/df11/file1".

Similarly, the FS1 has a directory "df21" and a directory "df22" under the highest directory, and has a file "file2" under the directory "df21". As shown in FIG. 4, the FS1 is mounted under "/dirb". Therefore, the highest directory of the FS1 is a directory "dirb" under the root directory. At this time, the path to the "file2" is "/dirb/df21/file2".

The FS2 has a directory "df31" and a directory "df32" under the highest directory. As shown in FIG. 4, the FS2 is mounted under "/dirc/subdir1". Therefore, the highest directory of the FS2 is a directory "subdir1" under a directory "dirc" further under the root directory.

The FS3 has a directory "df41" under the highest directory. As shown in FIG. 4, the FS3 is mounted under "/dirc/subdir2". Therefore, the highest directory of the FS3 is a directory "subdir2" under the directory "dirc" further under the root directory.

Since the mount point control tables 115 of the servers 110 have the same contents, the servers 110 provide the same namespace, as shown in FIG. 5, to the client 150.

In FIG. 5, the root directory and the directory "dirc" are defined for providing a shared namespace in which the FS0 to FS3 are mounted. Those directories do not correspond to a storage area on the disk subsystem 120, so files (data) cannot be stored directly under those directories. Therefore, in the namespace of FIG. 5, an area including the root directory and the directory "dirc" is called "pseudo file system". On the other hand, the FS0 to FS3 may be called "real file systems" in contrast to the pseudo file system.

Each server 110 is capable of name resolution within the pseudo file system and name resolution within the corresponding real file system that is managed by the server 110.

For example, the server 110A manages the FS0, and the server 110B manages the FS1. When the server 110B receives a request to access "/dira/df11/file1", the server 110B can perform name resolution for the root directory, but cannot perform name resolution for the directory "dira". At this time, the server 110B references the mount point control table 115 to notify the client 150 that has issued the access request that the directory "dira" is under management of the server 110A. FIG. 9 will be referenced to describe the above procedure later in detail.

FIG. 6 is an explanatory diagram of a file handle according to the embodiment of this invention.

The file handle is an identifier having a fixed length, which is assigned to each file (or directory) in a network file system (NFS). The file handle indicates a storage area on the disk subsystem 120 that stores data on the file.

A file handle 600 is composed of three fields consisting of a file system ID 601, i-node number 602, and a generation 603. Of those fields, the i-node number 602 and the generation 603 are the same as in a file handle used in a conventional NFS, so detailed description thereof will be omitted.

The file system ID 601 uniquely identifies the file system 202 to which a file belongs within the storage system 100. The file system ID 601 is created by the file system processing module 302 upon name resolution.

The file system ID 601 may be created in the same manner as the file system ID 401, as shown in FIG. 4, of the mount point control table 115. However, the file system ID 601 does not need to be the same as the file system ID 401 as long as the file system 202 is uniquely identified within the storage system 100.

As described above, the file system ID 601 uniquely identifies each file system 202 within the storage system 100. As a result, a storage area on the disk subsystem 120, which stores the data on each file, is uniquely indicated within the storage system 100 by the file handle 600.

Figure 7:
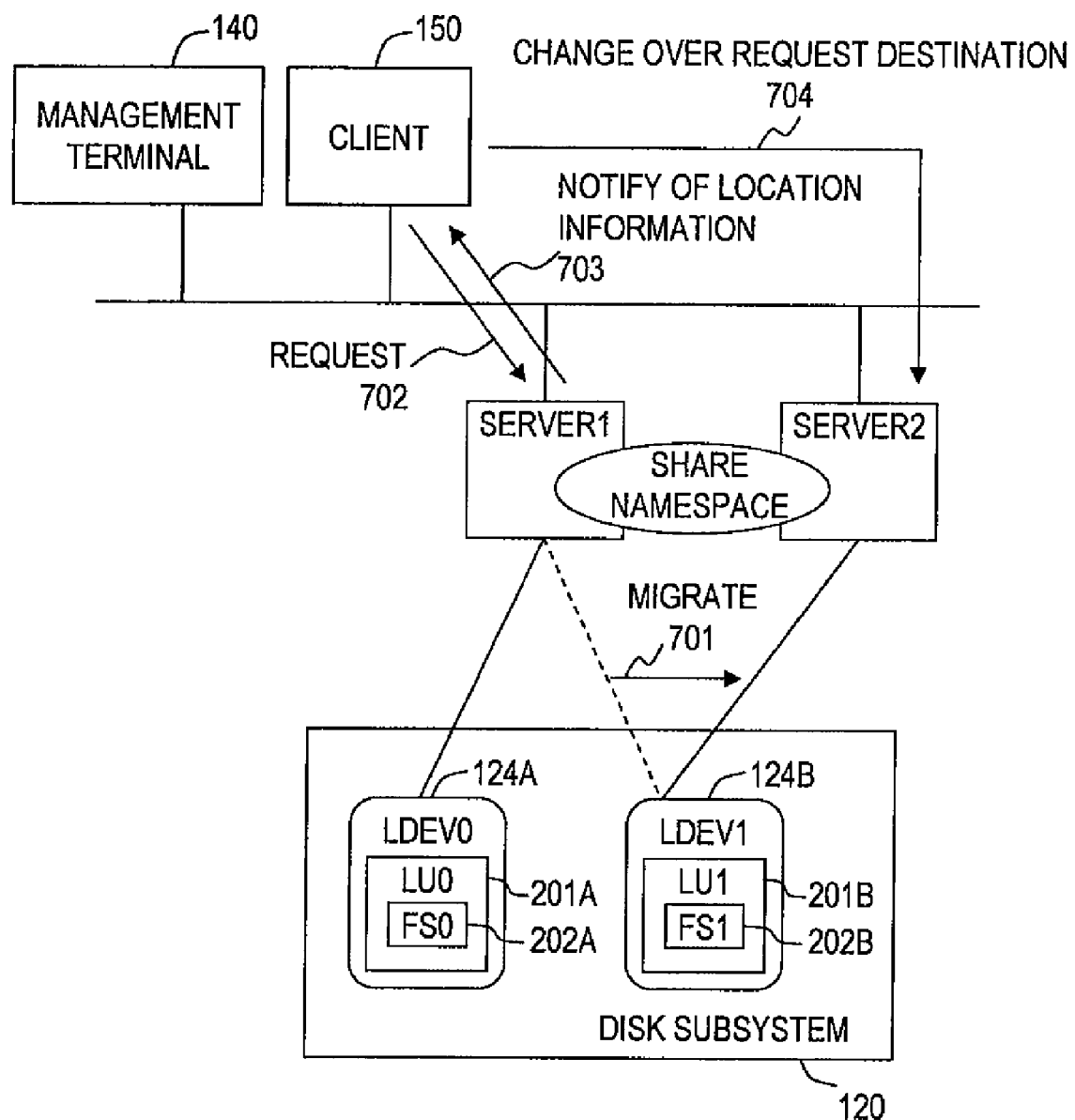
FIG. 7 is an explanatory diagram of an outline of a processing executed according to the embodiment of this invention.

FIG. 7 is an explanatory diagram of an outline of a processing executed according to the embodiment of this invention.

The configuration and logical structure shown in FIG. 7 is the same as the configuration and logical structure shown in FIGS. 1 and 2. However, unnecessary portions are omitted for explanation.

In FIG. 7, first, the FS0 and the FS1 are both under management of the server 110A (hereinafter, referred to as "server1"). Accordingly, before accessing a file (for example, the "file2" of FIG. 5) within the FS1, the client 150 issues a request to obtain a file handle of the target file "file2" to the server1. The server1 performs name resolution in response to the request to obtain a file handle, and returns the file handle 600 of the target file "file2" to the client 150. Hereinafter, for accessing the target file, the client 150 issues the access request to the server1 using the obtained file handle 600. The server1 accesses the "file2" according to the file handle 600, and responds to the client 150.

After that, the FS1 is migrated from the server1 to the server 110B (hereinafter, referred to as "server2") (701). The purpose of the migration is, for example, distribution of access loads. When the access loads on the server1 is high and when the access loads on the server2 is low, the FS1, which is one of the two file systems 202 managed by the server1, is placed under management of the server2, thereby distributing the access loads on the servers 110.

As a result, the FS1 is released from under management of the server1 and placed under the management of the server2. At this time, in the mount point control table 115, the server ID 403 corresponding to the FS1 is updated from "sid1" (the ID of the server1) into "sid2" (the ID of the server2). After that, the server1 cannot access files within the FS1.

Migration is executed according to an instruction from the management terminal 140, so the client 150 does not know that the migration has been executed. Therefore, for accessing the "file2" again, the client 150 uses the file handle 600, which has already been obtained, to issue an access request to the server1 (702).

The server1 references the file system ID 601 of the file handle 600 received from the client 150 and determines that the access request has been made for the FS1. Further, the server1 references the server ID 403 corresponding to the FS1 in the mount point control table 115. Since the referenced server ID 403 has a value of "sid2", the server1 determines that the FS1 is under management of the server2. Then, the server1 sends to the client 150 a notification that the FS1 including the target file "file2" is under management of the server2 (703).

Upon reception of the notification from the server1, the client 150 issues a request to access the "file2" to the server2 (704).

At this time, in the conventional NFS, the client 150 needs to issue the request to obtain a file handle of the target file "file2", and obtain a new file handle 600 of the "file2".

However, according to this invention, as shown in FIG. 5, the server1 and the server2 share the namespace, and the file system ID 601 included in the file handle 600 uniquely identifies each file system 202 within the storage system 100. Therefore, the client 150 can issue a request to access the "file2" to the server2 by using the file handle 600 obtained from the server1. The server2 accesses "file2" according to the file handle 600 and responds to the client 150.

Hereinafter, detailed description will be made of the processing executed according to the embodiment of this invention.

Figure 8:
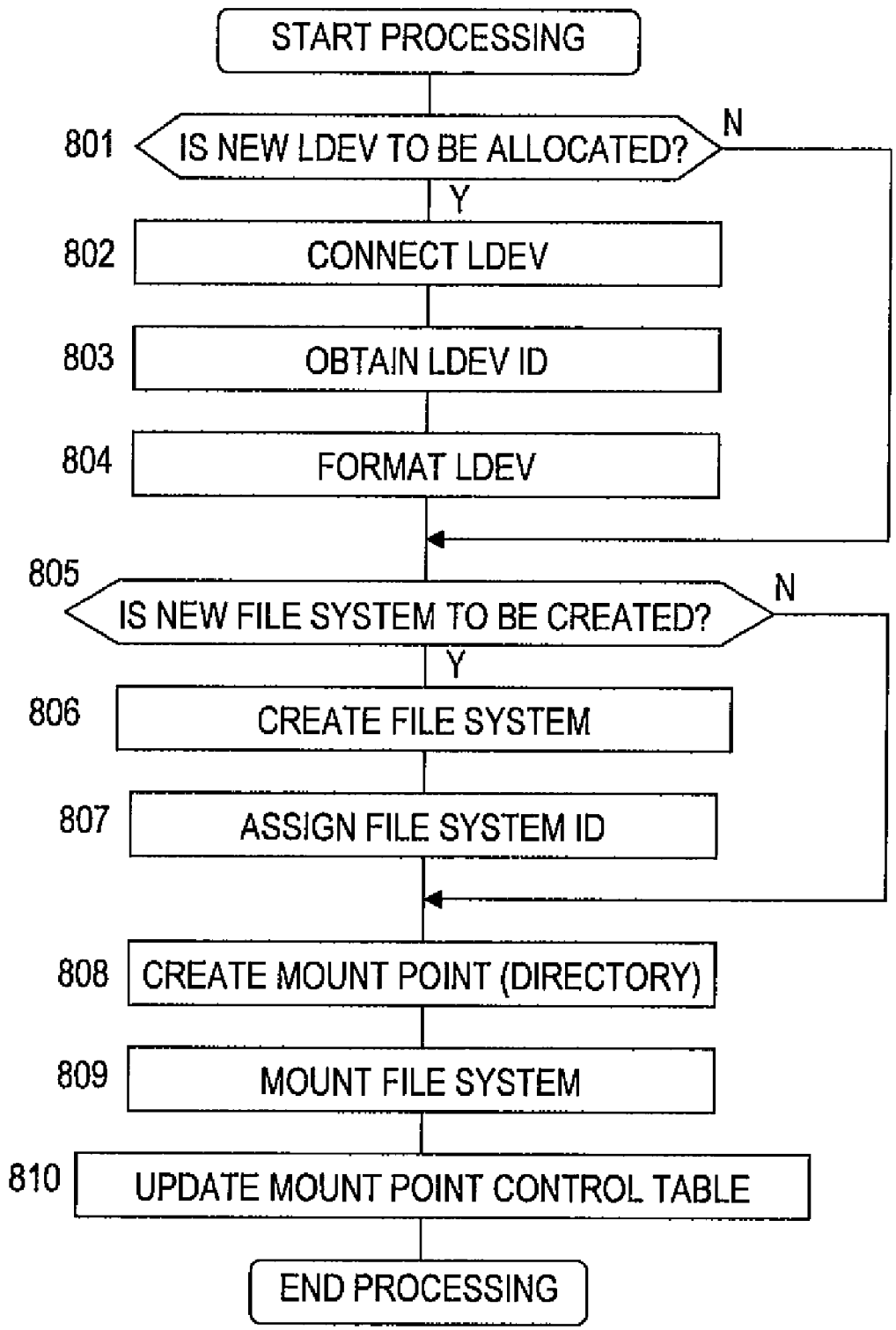
FIG. 8 is a flowchart of a file system creating processing executed according to the embodiment of this invention.

FIG. 8 is a flowchart of a file system creating processing executed according to the embodiment of this invention.

The file system creating processing is executed by the file system processing module 302. As described later, the file system creating processing is composed of three stages consisting of a new allocation processing (801 to 804) for an LDEV 124, a new creation processing (805 to 807) for a file system 202, and a mount processing (808 to 810).

When an instruction to create a new file system 202 is received from the management terminal 140, the file system processing module 302 may execute the three stages in order. Alternatively, the file system processing module 302 may execute the steps 801 to 804 upon reception of an instruction to allocate a new LDEV 124 from the management terminal 140, execute the steps 805 to 807 upon reception of an instruction to create a new file system 202, and execute the steps 808 to 810 upon reception of a mount instruction.

When the file system creating processing starts, the file system processing module 302 first judges whether a new LDEV 124 needs to be allocated (801). For example, when the management terminal 140 issues the instruction to allocate a new LDEV 124, and when the LDEV 124 in which a new file system 202 is to be created is not allocated, it is judged that a new LDEV 124 needs to be allocated.

When it is judged that a new LDEV 124 does not need to be allocated, the procedure advances to the step 805.

On the other hand, when it is judged that a new LDEV 124 needs to be allocated, the file system processing module 302 establishes connection to a LDEV 124 designated by the management terminal 140 (802). To be specific, the file system processing module 302 causes the LDEV 124 designated by the management terminal 140 to be recognized by an operating system (OS) on the server 110.

Then, the LDEV ID of the newly-allocated LDEV 124 is obtained (803). To be specific, the device number control module 304, which has received the instruction from the file system processing module 302, obtains the LDEV ID from the disk subsystem 120. The LDEV ID may be used for creating the file system ID 601 of the file handle 600 and the file system ID 401 of the mount point control table 115.

Then, the file system processing module 302 formats the newly-allocated LDEV 124 (804).

Next, the file system processing module 302 judges whether a new file system 202 needs to be created (805). For example, it is judged that a new file system 202 does not need to be created in the case where a file system 202 has already been created in the LDEV 124 newly allocated in the steps 801 to 804, and where the file system 202 is to be used.

When it is judged that a new file system 202 does not need to be created, the procedure advances to the step 808.

On the other hand, when it is judged that a new file system 202 needs to be created, the file system processing module 302 creates a new file system 202 in the LDEV 124 designated by the management terminal 140 (806).

Then, the file system processing module 302 assigns the file system ID 401 to the newly-created file system 202 (807). As described later with reference to the step 810, the assigned file system ID 401 is stored in the mount point control table 115. In the step 807, the file system ID 401 is created as described with reference to FIG. 4.

Next, the file system processing module 302 creates a mount point (808). To be specific, the file system processing module 302 creates a directory to which the newly-created file system 202 is mounted. For example, in FIG. 5, when the FS0 is newly created, the directory "/dira" to which the FS0 is mounted is created. It should be noted that a directory to which the newly-created file system 202 is mounted is designated by the management terminal 140.

Then, the file system processing module 302 mounts the newly-created file system 202 to the mount point created in the step 808 (809). To be specific, the file system processing module 302 reads out management information (not shown) on the file system 202 from the disk drive 123, and sets the access to the file system 202 to valid.

Then, the file system processing module 302 updates the mount point control table 115 (810). To be specific, the file system processing module 302 adds a new entry to the mount point control table 115. The new entry has the file system ID 401 set to the file system ID 401 created in the step 807, the path 402 set to the directory created in the step 808, and the server ID 403 set to the identifier of the server 110 that manages the newly-created file system 202.

Further, in the step 810, the file system processing module 302 notifies the other servers 110 of the updated contents of the mount point control table 115. The notification is sent by the inter-server communication processing module 306 that has received the instruction from the file system processing module 302. Each server 110 that has received the notification updates the mount point control table 115 within the server 110 based on the contents of the notification.

After the above-mentioned procedure, the file system creating processing ends.

FIG. 9 is a sequential diagram of a file access processing executed according to the embodiment of this invention.

Here, for convenience, description will be made by using an example case where the client 150 accesses the "file2" of FIG. 5 through the server2. The FS1 including the "file2" is initially managed by the server1. However, without its knowledge, the client 150 intends to access "file2" through the server2.

The client 150 first issues a request to obtain a file handle of the root directory to the server2 (901).

The root directory belongs to the pseudo file system. Therefore, both server1 and server2 are capable of name resolution of the root directory. The server2 performs the name resolution of the root directory and returns the file handle 600 of the root directory to the client 150 (902).

Of directories included in the path leading to the target file, when a directory belonging to the pseudo file system exists under the root directory, the client 150 issues the request to obtain a file system with respect to such a directory (903). The server2 returns the file handle 600 to the request (904). When there exist a plurality of such directories, the same procedure as the steps 903 and 904 is repeated with respect to such a directories. It should be noted that "lookup" shown in FIG. 9 represents a command that requests to obtain a file handle.

In the example of FIG. 5, the directory lower than the root directory by one level is the "dirb". The "dirb" is a mount point for the FS1 (in other words, the highest directory of the FS1). On the path to the "file2", there exists no directory belonging to the pseudo file system under the root directory. Therefore, for accessing the "file2" of FIG. 5, the client 150 issues the request to obtain a file handle of the directory "dirb" subsequently to the step 902 (905).

In the step 905, the client 150 issues the request to obtain a file handle of the directory "dirb" to the server2. However, the real file system FS1 to which the "dirb" belongs is under management of the server1, the server2 cannot perform name resolution of the "dirb". The server2 references the mount point control table 115 for the path 402 relating to the FS1 to send to the client 150 a notification that the "dirb" is under management of the server1 (906).

The client 150 receives the notification of a file system location of the step 906, and then issues the request to obtain a file handle of the directory "dirb" to the server1 (907). The server1 returns the file handle 600 of the directory "dirb" to the client 150 (908).

Similarly, the client 150 issues requests to obtain file handles of the directory "df21" and the "file2" to the server1, and the server1 returns the file handles to the respective requests (not shown). As a result, the client 150 obtains the file handle of the "file2".

Next, the client 150 uses the file handle 600 of the "file2" to issue a file access request to the server1 (909). In response to the request, the server1 accesses "file2" of the FS1 and responds to the client 150 (910).

After that, when the need arises for accessing the "file2", the client 150 uses the file handle 600 obtained in the step 908 to access the "file2" through the server1 (909, 910).

Next, the FS1 is migrated from the server1 to the server2 (911). As a result, in the mount point control table 115, the value of the server ID 403 corresponding to the FS1 is updated into "sid2" (ID of the server2). FIG. 10 will be referenced to describe the procedure of the migration later in detail.

At this time, the client 150 does not know that the FS1 has been migrated. Therefore, when the need arises to for accessing the "file2", the client 150 issues to the server1 a file access request using the file handle 600 obtained in the step 908 (912).

At this time, the FS1 to which the "file2" belongs is not under management of the server1. Therefore, the server1 cannot access the "file2". The server1 references the file system ID 601 of the file handle 600 and the file system ID 401 and server ID 403 of the mount point control table 115 to send to the client 150 a notification that the FS1 has been migrated to the server2 (913).

The client 150 receives the notification and issues to the server2 a file access request to access the "file2" (914).

Conventionally, at this time, similarly to the steps 901 to 906, it is necessary that the client 150 issue the request to obtain a file handle to the server2 and that the server2 perform name resolution.

However, according to this invention, the servers 110 share a namespace, and the file handle 600 is uniquely determined within the storage system 100. Therefore, in the step 914, the client 150 may use the file handle 600 used in the steps 909 and 912 as it is.

In response to the file access request from the client 150, the server1 accesses the "file2" of the FS1 and responds to the client 150 (915).

FIG. 10 is a flowchart of a migration processing executed according to the embodiment of this invention.

FIG. 10 shows an example of a procedure of migration of the FS1 from the server1 to the server2, which is executed in the step 911 of FIG. 9. The migration processing of FIG. 10 is executed by the migration processing modules 307 of the server1 and the server2.

First, description will be made of the migration processing executed by the migration processing module 307 on the server1 (in other words, a migration source).

In response to a migration instruction from the management terminal 140, the server1 starts the migration processing (1001). The migration instruction includes the file system ID of a file system 202 to be migrated and the server ID of a migration destination server 110.

In the example of FIG. 10, the file system 202 to be migrated is the FS1. The migration destination server 110 is the server2.

When the migration processing starts, the server1 first sends to the server2 a notification that the migration processing has started (1002). The notification includes the file system ID of a file system 202 to be migrated.

The notification is sent through the inter-server communication path 135 by the inter-server communication processing module 306 that has received the migration instruction from the migration processing module 307.

After execution of the step 1002, the server1 receives from the client 150 the request to obtain a file handle or the file access request for a file (for example, "file2") within the FS1, and then returns a file system location notification to the client 150 in the step 906 or 913 of FIG. 9. The server1 may reference the migration instruction from the management terminal 140 to return the migration destination server ID to the client 150.

Then, the server1 updates the mount point control table 115 (1003). To be specific, in the mount point control table 115, the value of the server ID 403 corresponding to the FS1 is updated from "sid1" (ID of the server1) into "sid2" (ID of the server2).

The server1 notifies all the other servers 110 within the storage system 100, of the updated contents of the mount point control table 115. The notification is sent by the inter-server communication processing module 306 that has received the migration instruction from the migration processing module 307. Each server 110 that has received the notification updates the mount point control table 115 within the server 110 based on the notified contents.

Then, the server1 writes dirty data to the disk drive 123 (1004). In other words, when data on a file belonging to the FS1 is not written to the disk drive 123 and is written only to the disk cache 122, the data is written to the disk drive 123.

Then, the server1 unmounts the file system 202 (1005). To be specific, the access from the server1 to the FS1 is set to invalid.

Then, the server1 disconnects the LDEV 124 (1006). To be specific, it is made impossible that the LDEV1 storing the FS1 is recognized by the OS on the server1.

Then, the server1 sends to the server2 a notification that the migration processing has ended (1007). The notification is sent through the inter-server communication path 135 by the inter-server communication processing module 306 that has received the migration instruction from the migration processing module 307.

After the above-mentioned procedure, the migration processing executed by the migration processing module 307 on the server1 ends.

Next, description will be made of the migration processing executed by the migration processing module 307 on the server2 (in other words, a migration destination).

In response to a migration instruction from the management terminal 140, the server2 starts the migration processing (1011). The migration instruction includes the file system ID of the file system 202 to be migrated (FS1 in the example of FIG. 10).

Then, the server2 receives the migration start notification (1002) from the server1.

It should be noted that when information included in the migration instruction of the step 1011 is also included in the migration start notification (1002), the step 1011 is unnecessary. In that case, the server2 receives the migration start notification from the server1, and then starts the migration processing.

When the file access request for a file (for example, "file2") within the file system 202 to be migrated is received from the client 150 after reception of the migration start notification (1002) and before the end of mount (1014), the server2 suspends the file access request or returns a temporary error (1012). The same applies to the case where the request to obtain a file handle with respect to the FS1 is received.

In the case where the file access request is suspended, the server2 executes the suspended access after the end of the migration processing, and responds to the client 150.

In the case where the temporary error is returned, the client 150 issues the same file access request again after a while. Here, the term "temporary error" represents an error to notify the client 150 that the processing cannot be executed within a predetermined time due to an increase in loads. According to NFSv4, for example, NFS4ERR_DELAY is returned as the temporary error.

In the conventional migration processing, the migration start notification (1002) is not issued, so the server2 cannot know that the server2 itself is set as the migration destination until the end of migration. Therefore, when the file access request for the file system 202 to be migrated is received from the client 150 after the start of migration and before the end of migration, the server2 returns a message that the desired file does not exist, which becomes an application error.

On the other hand, according to this invention, the server2 knows that the server2 itself is set as the migration destination by the migration start notification (1002). Accordingly, even in the case where the server2 cannot access the file system 202 upon reception of the file access request for the file system 202 to be migrated, the server2 knows that the access becomes possible after a while. Therefore, the server2 can suspend such a file access request or return the temporary error. As a result, the application error can be avoided.

Upon reception of the migration end notification (1007), the server2 connects the LDEV 124 (1013). To be specific, the OS on the server2 is caused to recognize the LDEV 124 including the migrated file system 202.

Then, the server2 mounts the migrated file system 202 (1014). To be specific, the same procedure as the step 809 of FIG. 8 is executed.

Upon completion of the mount of the step 1014, the server2 starts a service for the client 150 (1015). To be specific, the server2 starts to provide the client 150 with the access to the FS1. When the file access request suspended in the step 1012, the access is executed.

After the above-mentioned procedure, the migration processing executed by the migration processing module 307 on the server2 ends.

The migration processing of FIG. 10 does not copy data on the FS1 itself and changes only logical connection between the server 110 and the FS1. However, the migration processing may be executed by copying the data through remote copy etc. The same procedure as that of FIG. 10 is executed even in that case.

For example, the migration processing may be executed by copying all data on the file system 202 to the newly-created LDEV 124.

Here, when the file system ID 601 of the file handle 600 is determined based on the LDEV ID, the LDEV ID of a copy source LDEV 124 is taken over to a copy destination LDEV 124. In other words, the LDEV ID of the copy destination LDEV 124 becomes the same as the LDEV ID of the copy source LDEV 124 which is used before the execution of copy. The copy source LDEV 124 is deleted or has its LDEV ID changed into another value. As a result, the file system ID 601 of the file handle 600 holds the same value before and after the migration. Accordingly, the same file handle 600 as before can be used after the migration.

Another example of copying data for migration is the case where a plurality of file systems 202 are stored in one LDEV 124, and one of the file systems 202 is migrated to another server 110. In this case, a file system that is not to be migrated is stored within the same LDEV 124, so the migration cannot be executed by the change in logical connection. Therefore, all the data on the file system 202 to be migrated need to be copied to another LDEV 124.

Here, when the file system ID 601 of the file handle 600 is determined based on the LDEV ID, the LDEV ID of the copy source LDEV 124 cannot be taken over to the copy destination LDEV 124. This is because other file systems 202 remain in the copy destination LDEV 124, which is allowed neither to be deleted nor to have its LDEV ID changed. As a result, the file system ID 601 of the file handle 600 changes before and after the migration. Accordingly, the same file handle 600 as before cannot be used after the migration.

Therefore, in order to implement this invention even in the case where a plurality of file systems 202 are stored in one LDEV 124, it is necessary that the file system ID 601 of the file handle 600 be determined regardless of the LDEV ID.

It should be noted that the copy of the file system 202 and the takeover of the LDEV ID may be executed based on an instruction from the migration source server 110 or on an instruction from the migration destination server 110.

Figure 11A:
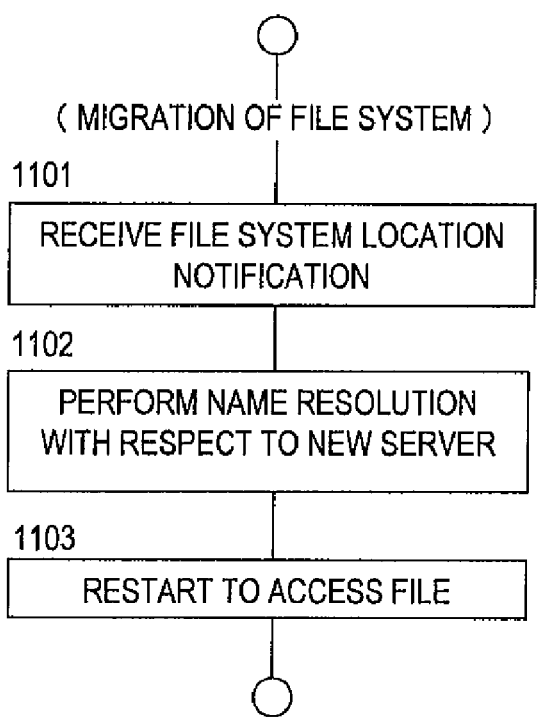
FIG. 11A is the flowchart of the processing executed by the client that accesses the conventional storage system.
Figure 11B:
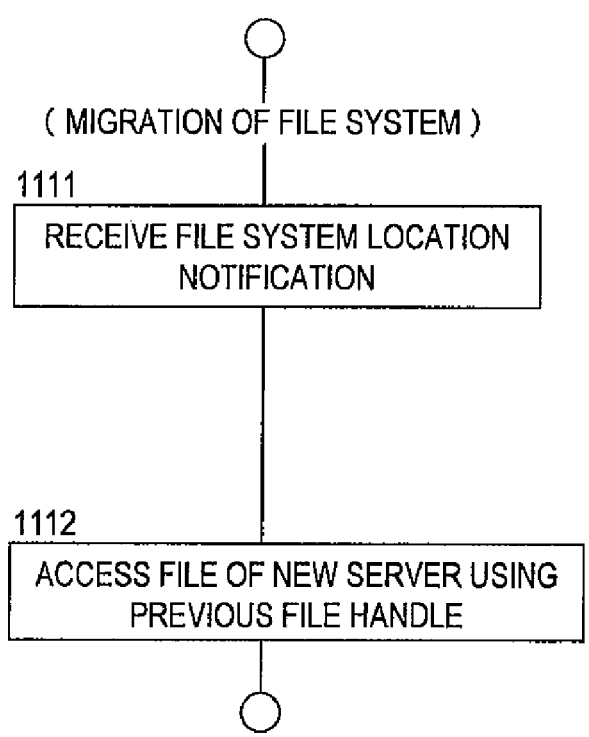
FIG. 11B is the flowchart of the processing executed by the client that accesses the storage system according to this embodiment of this invention.

FIGS. 11A and 11B are flowcharts showing an outline of a processing executed by the client according to the embodiment of this invention.

FIG. 11A is the flowchart of the processing executed by the client 150 that accesses the conventional storage system.

FIG. 11B is the flowchart of the processing executed by the client 150 that accesses the storage system 100 according to the embodiment of this invention.

FIGS. 11A and 11B both show the processing executed by the client 150 that accesses the file system 202 that has been migrated. At this time, the client 150 issues a file access request to the migration destination server 110 without knowing that the migration has been executed.

First, FIG. 11A will be referenced to describe the processing.

The client 150 receives a file system location notification from a server (1101).

Then, the client 150 issues the request to obtain a file handle a migration destination server (new server) notified of in the step 1101, and causes the server to perform name resolution (1102).

Then, the client 150 restarts the access to a desired file. To be specific, the client 150 uses the file handle obtained in the step 1102 to issue a file access request to the migration destination server (1103).

Next, FIG. 11B will be referenced to describe the processing.

The client 150 receives the file system location notification from the server 110 (1111).

Then, the client 150 executes the access to the desired file. To be specific, the client 150 uses the file handle 600 obtained before the execution of migration to issue a file access request to the migration destination server (new server) 110 (1112).

As described above, conventionally, in order to access the file system 202 that has been migrated, a file handle needs to be obtained again. Thus, the client 150 needs to return an error to the application. Upon reception of the error, the application needs to open the file again. Alternatively, the client 150 may store the path name of the desired file. However, the currently-available client 150 has no such function.

However, according to this invention, the file handle 600 obtained before the execution of migration may be used after the migration. Therefore, the file handle 600 does not need to be obtained again after migration.

When NFSv4 is adopted, in the conventional processing as shown in FIG. 11A, a file handle is set to invalid after migration, so a volatile file handle is used. On the other hand, in the processing according to the embodiment of this invention as shown in FIG. 11B, a file handle does not need to be set to invalid, so a persistent file handle is used.

Next, description will be made of an interface for managing the storage system 100 according to the embodiment of this invention. The interface is provided to the administrator of the storage system 100 by the management terminal 140.

FIG. 12 is an explanatory diagram of a file system list display screen that is displayed on a management screen of the management terminal 140 according to the embodiment of this invention.

The file system list display screen includes a file system list 1200, a create button 1207, a delete button 1208, and a migrate button 1209.

In the file system list 1200, an LDEV 1201 indicates LDEV IDs of the LDEVs 124 managed by the management terminal 140. The example of FIG. 12 shows the same LDEVs 124 as those shown in FIG. 2.

An FS 1202 indicates file system IDs of the file system 202 stored in the LDEVs 124. In the example of FIG. 12, the same file system 202 as that shown in FIG. 2 is stored in each LDEV 124. The FS 1202 of FIG. 12 is the same as the file system ID 401 of FIG. 4.

A size 1203 indicates a storage capacity (megabyte) that is allocated to each LDEV 124. In the example of FIG. 12, the LDEV0, LDEV1, LDEV2, and LDEV3 are allocated with 50 gigabytes (GB), 30 GB, 20 GB, and 200 GB, respectively.

A mount point 1204 indicates a mount point that is set for each file system 202. In the example of FIG. 12, the same mount point as the path 402 of FIG. 4 is set.

A server 1205 indicates an identifier of the server 110 that manages each file system 202. In the example of FIG. 12, the relationship between each file system 202 and the server 110 that manages the file system 202 is the same as FIG. 4. Therefore, the servers 1205 have the same values as the server IDs 403 of FIG. 4.

An option 1206 indicates an attribute that is set for each LDEV 124. In the example of FIG. 12, the options 1206 of the LDEV0, LDEV1, and LDEV3 are set to "rw" (read/write). This implies that the three LDEVs 124 permit data write and read. In other words, the client 150 can write and read out data to/from the three LDEVs 124.

In contrast, the option 1206 of the LDEV2 is set to "ro" (read_only). This implies that the LDEV2 inhibits data write. In other words, the client 150 cannot write data to the LDEV2.

The create button 1207 is used to create a new file system 202.

The delete button 1208 is used to delete the file system 202. For example, when the administrator selects the file system 202 to be deleted and operates the delete button 1208, the selected file system 202 is deleted. Here, the selection of the file system 202 may be executed by operating (for example, mouse-clicking) a circle mark on the left of each LDEV 1201 of FIG. 12 with a pointing device (not shown). The delete button 1208 may be operated with the pointing device similarly.

The migrate button 1209 is used when the file system 202 is migrated. For example, when the administrator selects the file system 202 to be migrated and operates the migrate button 1209, another screen as shown in FIG. 13 is displayed, and migration is executed.

Figure 13:
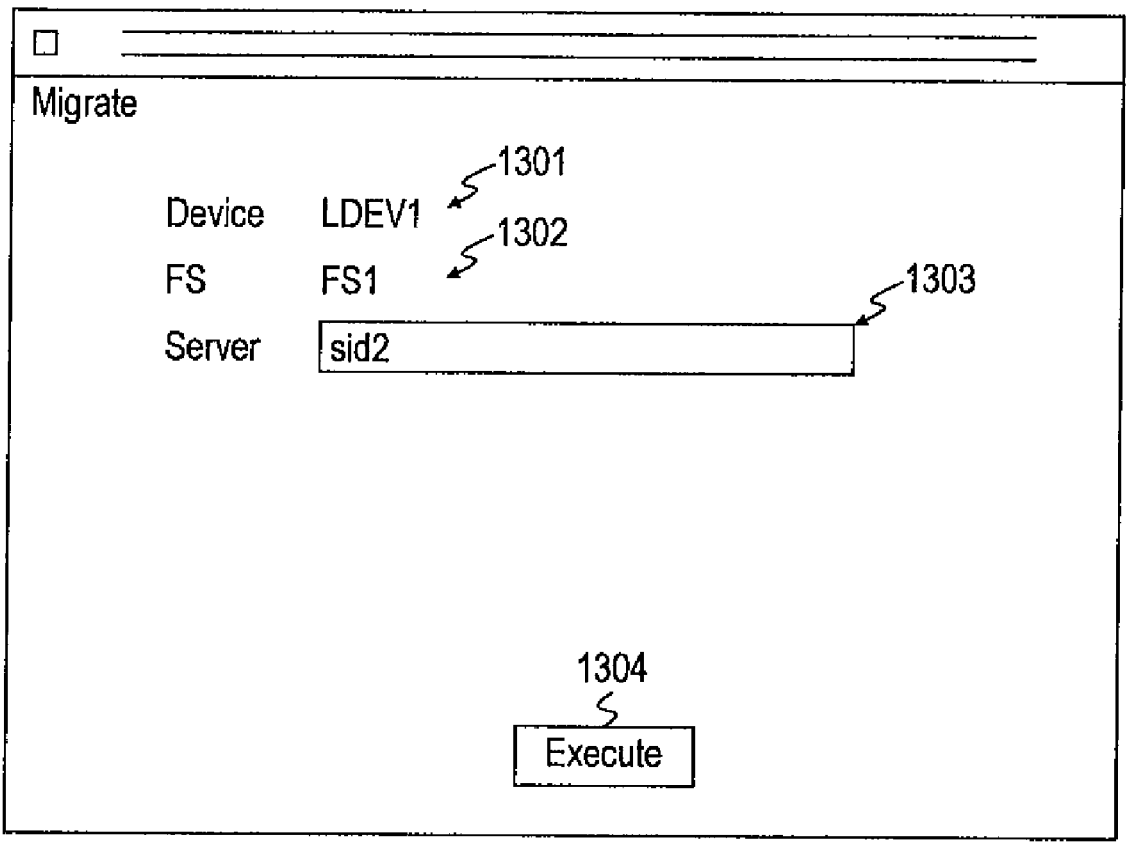
FIG. 13 is an explanatory diagram of a migration setting screen that is displayed on the management screen of the management terminal according to the embodiment of this invention.

FIG. 13 is an explanatory diagram of a migration setting screen that is displayed on the management screen of the management terminal 140 according to the embodiment of this invention.

The migration setting screen is displayed when the administrator selects the file system 202 on the file system list display screen as shown in FIG. 12 and operates the migrate button 1209. FIG. 13 shows the example of the migration setting screen in the case where the administrator selects the FS1 on the file system list display screen.

The migration setting screen includes an LDEV display field 1301, a file system display field 1302, a server entry field 1303, and an execute button 1304.

The LDEV display field 1301 displays the LDEV ID of the LDEV 124 corresponding to the file system 202 selected by the administrator. In the example of FIG. 13, the LDEV1 is displayed.

The file system display field 1302 displays the file system ID of the file system 202 selected by the administrator. In the example of FIG. 13, the FS1 is displayed.

In the server entry field 1303, the ID of the migration destination server 110 is entered. In the example of FIG. 13, "sid2" is entered. This implies that the administrator intends to migrate the FS1 to the server2.

The execute button 1304 is used to execute migration. When the administrator operates the execute button 1304, the migration processing starts to migrate the FS1 stored in the LDEV1 to the server2.

As has been described above, according to this invention, it is possible to distribute the access loads on servers by migrating a file system between the servers.

Further, according to this invention, all servers within a storage system share a namespace. The file handle corresponding to each file is uniquely set within the storage system. Each file handle holds the same values even after the execution of migration. As a result, the file handle obtained before the execution of migration can be used even after the execution of migration.

Further, according to this invention, the migration destination server is notified that the execution of migration has started. When the file access request for a file system to be migrated is received during the execution of migration, the migration destination server suspends the file access request or returns the temporary error. In either case, the access is executed after the execution of migration, the client does not need to return the error to the application.

What is claimed is:

1. A storage system, comprising:
a plurality of servers; and
a disk subsystem that is coupled to the plurality of servers,
wherein the disk subsystem comprises:
at least one logical device, and
at least two file systems that are stored in the at least one logical device,
wherein the servers each hold a management table that serves to manage a mount point of each file system,
wherein the management table stores file system identifiers that uniquely identify the file systems within the storage system, mount point information that indicates the mount point of each of the file systems, and management server identifiers that indicate an identifier of each of the servers that manage the file systems, while sharing the same contents among the servers,
wherein upon reception of a request from a client to obtain through a second server a file handle of a file, initially handled by a first server, that indicates a storage area on the disk subsystem in which data on the file within a file system is stored, a file access processing is performed such that the servers each return the file handle that indicates, uniquely within the storage system, the storage area on the disk subsystem in which the data on the file relating to the request is stored,
wherein said file handle includes one of said file system identifiers and an i-node number,
wherein if one of said file systems is migrated to other server, the server which updates the management table and notifies all the other servers of the updated contents,
wherein the file access processing includes:
issuing by a the client a request to obtain a file handle of a root directory to the second server,
wherein the root directory belongs to a pseudo file system for which both the first server and the second server are capable of name resolution,
performing, by the second server, the name resolution of the root directory and returning the file handle of the root directory to the client,
when a directory belonging to the pseudo file system exists under the root directory, issuing, by the client, a request to obtain a file system with respect to the directory belonging to the pseudo file system that exists under the root directory, and returning, by the second server, in response to the request to obtain a file system the file handle of the file system with respect to the directory belonging to the pseudo file system that exists under the root directory,
when no directory belonging to the pseudo file system exists under the root directory, issuing, by the client, a request to obtain a file handle of a directory which is a mount point of a real file system below the pseudo file system,
since the real file system is under management of the first server and the second server cannot perform name resolution of the directory which is a mount point of a real file system below the pseudo file system, referring, by the second server, to a mount point control table for a path relating to the real file system to send to the client a notification that the directory which is a mount point of a real file system below the pseudo file system is under management of the first server,
receiving, by the client, the notification of the location of the real file system and issuing a request to obtain a file handle of the directory which is a mount point of a real file system below the pseudo file system to the first server, and then returning, by the first server, the file handle of the directory which is a mount point of a real file system below the pseudo file system to the client,
using, by the client, the file handle of the file to issue a file access request to the first server and responding, by the first server, by permitting the client to access the file,
wherein migration of a file system includes:
upon reception of a migration instruction to migrate a file system to the second server, updating, by the first server, the management server identifier of the management table held by the first server, which corresponds to the file system designated by the migration instruction, into an identifier of the second server, and sending at least updated contents of the management table to the second server,
referring, by the second server, the updated contents of the management table sent from the first server and updating the management table held by the second server,
sending, by the first server, a start notification of starting migration to the second server after receiving the migration instruction, and
returning, by the first server, the identifier of the second server upon receiving a file access request for the file within the file system designated by the migration instruction after sending the start notification.

2. The storage system according to claim 1, wherein the plurality of servers comprise a first server and a second server,
   wherein upon reception of an instruction to newly create a file system, the first server creates the file system in a logical device involved in the instruction, updates the contents of the management table by adding a file system identifier, mount point information, and management server identifier that relate to the newly-created file system, and sends at least updated contents of the management table to the second server, and
   wherein the second server references the updated contents of the management table sent from the first server and updates the management table held by the second server.

3. The storage system according to claim 1, wherein the second server mounts the file system designated by the migration instruction, and
   wherein the second server suspends the file access request upon receiving the file access request for the file within the file system designated by the migration instruction after receiving the start notification and before ending the mount.

4. The storage system according to claim 1, wherein the second server mounts the file system designated by the migration instruction, and
   wherein the second server returns a temporary error upon receiving the file access request for the file within the file system designated by the migration instruction after receiving the start notification and before ending the mount.

5. The storage system according to claim 1, wherein the start notification comprises a logical device identifier that identifies, uniquely within the storage system, a logical device in which the file system designated by the migration instruction is stored,
   wherein upon reception of the migration instruction, the first server copies the file system designated by the migration instruction from a copy source logical device in which the file system is stored to a copy destination logical device, and
   wherein the logical device identifier of the copy destination logical device is set to be the same as the logical device identifier of the copy source logical device held before the first server copies the file system.

6. The storage system according to claim 1, wherein the file handle comprises a logical device identifier that identifies, uniquely within the storage system, a logical device in which the file system is stored.

7. The storage system according to claim 6, wherein the file handle further comprises:
   a file system number that uniquely identifies the file system within the logical device.

8. A control method for a storage system that comprises:
   a plurality of servers and a disk subsystem coupled to the plurality of servers and is coupled to client computers, the disk subsystem comprising at least one logical device and at least two file systems that are stored in the at least one logical device, the plurality of servers comprising a first server and a second server, the control method comprising the steps of:
   controlling the first server to receive, from the client computer, a request to obtain a file handle, initially handled by the first server, that indicates a storage area on the disk subsystem in which data on a file within a file system is stored and to perform a file access processing such that the file handle is returned;
   controlling the first server to return the file handle relating to the request to obtain a file handle to the client computer;
   controlling the first server to receive, from the client computer, a file access request for the file using the file handle;
   controlling the first server to access data on a file relating to the file access request within the disk subsystem by using the file handle, and to return a result of the access to the client computer;
   controlling the first server, after the file system is migrated from the first server to the second server, to receive, from the client computer, a file access request for the file within the file system using the file handle, which is obtained before the migration;
   controlling the first server to return a server identifier that identifies the second server to the client computer;
   controlling the second server to receive, from the client computer, a file access request for the file within the file system using the file handle, which is obtained before the migration; and
   controlling the second server to access data on a file relating to the file access request within the disk subsystem by using the file handle, which is obtained before the migration, and to return a result of the access to the client computer,
   wherein said file handle includes one of said file system identifiers and an i-mode number, and
   wherein if one of said file systems is migrated to other server, the server which updates the management table and notifies all the other servers of the updated contents,
   wherein the file access processing includes:
   issuing by a the client a request to obtain a file handle of a root directory to the second server,
   wherein the root directory belongs to a pseudo file system for which both the first server and the second server are capable of name resolution,
   performing, by the second server, the name resolution of the root directory and returning the file handle of the root directory to the client,
   when a directory belonging to the pseudo file system exists under the root directory, issuing, by the client, a request to obtain a file system with respect to the directory belonging to the pseudo file system that exists under the root directory, and returning, by the second server, in response to the request to obtain a file system the file handle of the file system with respect to the directory belonging to the pseudo file system that exists under the root directory,
   when no directory belonging to the pseudo file system exists under the root directory, issuing, by the client, a request to obtain a file handle of a directory which is a mount point of a real file system below the pseudo file system,
   since the real file system is under management of the first server and the second server cannot perform name resolution of the directory which is a mount point of a real file system below the pseudo file system, referring, by the second server, to a mount point control table for a path relating to the real file system to send to the client a notification that the directory which is a mount point of a real file system below the pseudo file system is under management of the first server,
   receiving, by the client, the notification of the location of the real file system and issuing a request to obtain a file handle of the directory which is a mount point of a real file system below the pseudo file system to the first server, and then returning, by the first server, the file handle of the directory which is a mount point of a real file system below the pseudo file system to the client, using, by the client, the file handle of the file to issue a file access request to the first server and responding, by the first server, by permitting the client to access the file, wherein migration of a file system includes:

upon reception of a migration instruction to migrate a file system to the second server, updating, by the first server, the management server identifier of the management table held by the first server, which corresponds to the file system designated by the migration instruction, into an identifier of the second server, and sending at least updated contents of the management table to the second server, referring, by the second server, the updated contents of the management table sent from the first server and updating the management table held by the second server, sending, by the first server, a start notification of starting migration to the second server after receiving the migration instruction, and returning, by the first server, the identifier of the second server upon receiving a file access request for the file within the file system designated by the migration instruction after sending the start notification.

9. The control method according to claim 8, wherein the servers each hold a management table that serves to manage a mount point of the file system, and wherein the management table stores file system identifiers that uniquely identify each of the file systems within the storage system, mount point information that indicates the mount point of each of the file systems, and management server identifiers that indicate an identifier of each of the servers that manage the file systems, the control method further comprising the steps of:

controlling the first server to receive a migration instruction to migrate a file system to the second server;

controlling the first server to update the management server identifier of the management table held by the first server, that corresponds to the file system designated by the migration instruction, into an identifier of the second server;

controlling the first server to send at least updated contents of the management table to the second server; and controlling the second server to reference the updated contents of the management table sent from the first server to update the management table held by the second server.

10. The control method according to claim 8, further comprising the steps of:

controlling the second server to mount the file system designated by the migration instruction; and controlling the second server to return a temporary error upon receiving the file access request for the file within the file system designated by the migration instruction after receiving the start notification and before ending the mount.

11. The control method according to claim 8, wherein the start notification comprises a logical device identifier that identifies, uniquely within the storage system, a logical device in which the file system designated by the migration instruction is stored, the control method further comprising the steps of:

controlling the first server to copy the file system designated by the migration instruction from a copy source logical device in which the file system is stored to a copy destination logical device; and setting the logical device identifier of the copy destination logical device to be the same as the logical device identifier of the copy source logical device held before the first server copies the file system.

12. The control method according to claim 8, wherein the servers each hold a management table that serves to manage a mount point of the file system, and wherein the management table stores file system identifiers that uniquely identify the file systems within the storage system, mount point information that indicates the mount point of each of the file systems, and management server identifiers that indicate an identifier of each of the servers that manage the file systems, the control method further comprising the steps of:

controlling the first server to create a file system in a logical device involved in an instruction to newly create the file system upon reception the instruction;

controlling the first server to update the contents of the management table by adding a file system identifier, mount point information, and a management server identifier that relate to the newly-created file system;

controlling the first server to send at least updated contents of the management table to the second server; and controlling the second server to reference the updated contents of the management table sent from the first server and update the management table held by the second server.

* * * * *